United States Patent
Roberts

[15] 3,699,363
[45] Oct. 17, 1972

[54] PROCESS CONTROL CIRCUITRY
[72] Inventor: George S. Roberts, Avon, Ohio
[73] Assignee: By George, Inc., Avon, Ohio
[22] Filed: Sept. 8, 1970
[21] Appl. No.: 70,204

[52] U.S. Cl. ..................307/308, 219/499, 219/505, 307/252 B
[51] Int. Cl. ...........................................H03k 17/56
[58] Field of Search...307/235, 252 B, 308; 219/494, 219/499, 501, 505

[56] References Cited

UNITED STATES PATENTS 3,109,082  10/1963  Polaniecki.............219/501 X
3,105,175  9/1963  Siliani et al. ............219/499 X
3,149,224  9/1964  Horne et al............219/501 X
3,161,759  12/1964  Gambill et al. ........219/501 X
3,299,345  1/1967  Werts....................219/501 X Primary Examiner—John Zazworsky
Attorney—Watts, Hoffmann, Fisher & Heinke

[57] ABSTRACT

A control circuit utilizes a bridge arrangement responsive to variable resistance in one arm thereof that varies as a harmonic progression to control an external device such as a relay. An opposite arm of the bridge serves as a linear set point control for the external device that controls a process variable.

21 Claims, 1 Drawing Figure

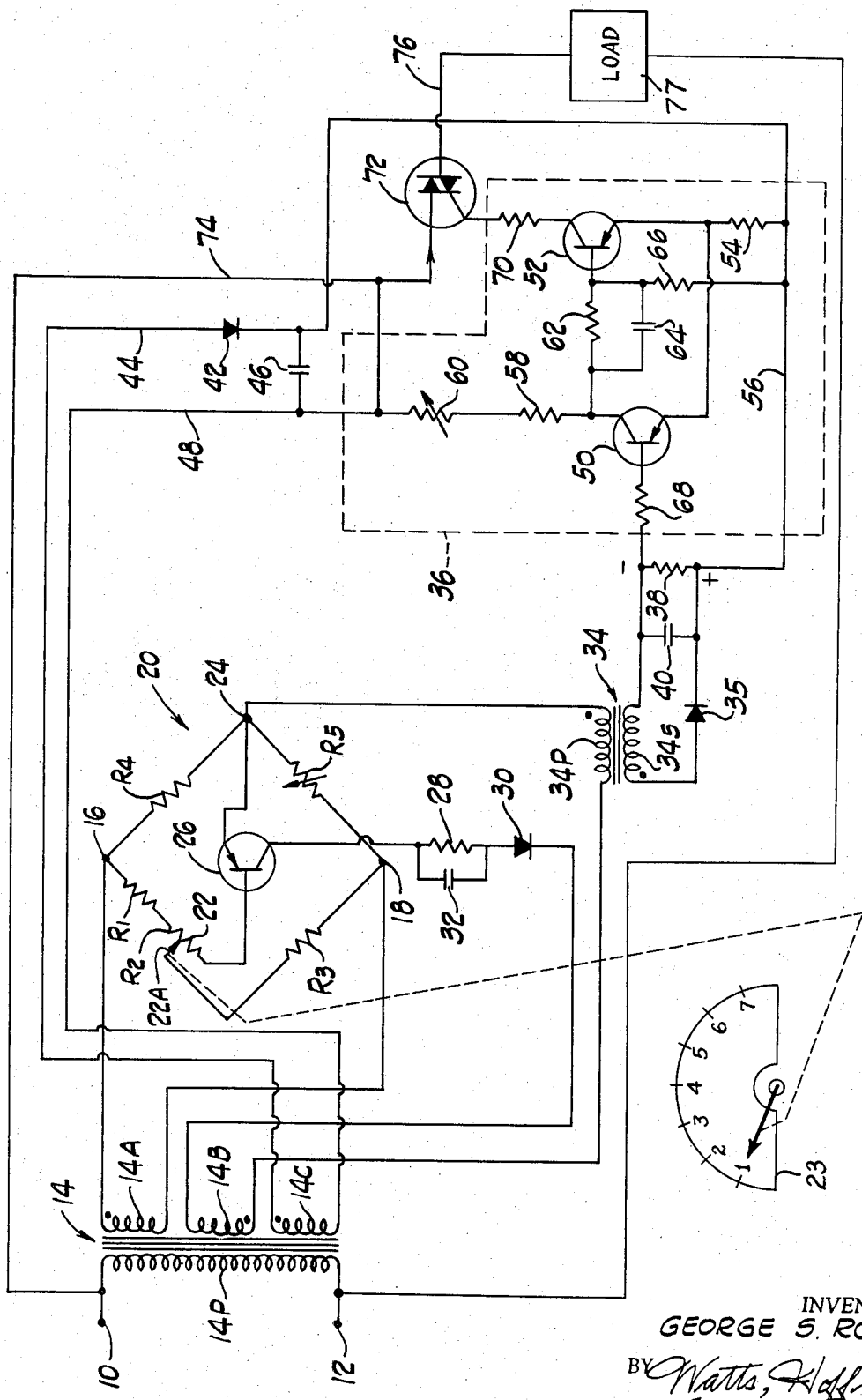

PROCESS CONTROL CIRCUITRY

SUMMARY OF THE INVENTION

A resistance bridge similar to a Wheatstone bridge is used to provide a set point control for a process in which resistance of a substance in the process in one arm is subject to a variation as a harmonic progression. The opposite arm of the bridge serves as a linearly-variable set point control. Unbalance of the bridge triggers a Schmitt trigger circuit that, in turn, controls an external device. The external device may be a relay or other process control device that causes the resistance of the substance to be varied to rebalance the bridge.

BRIEF DESCRIPTION OF THE DRAWING

The single FIGURE of the drawing is a schematic diagram of control circuitry embodying the invention.

DESCRIPTION OF A PREFERRED EMBODIMENT

It has been known to use a Wheatstone bridge to measure an unknown resistance and use unbalance of the bridge to control other circuitry to return the bridge to a balanced condition. It has also been known to provide a variable resistance in the arm of the bridge opposite the arm that contains the unknown resistance to act as a set point adjustment. However, prior to the present invention, if the unknown resistance varied as a harmonic progression (e.g., 1, ½, ⅓, ¼, 1/5, and so on), it was necessary to use a non-linear variable resistor in the opposite arm to balance the bridge.

Traditionally, operators in a process control operation do not like non-linear scales on a set point control. This is because the control becomes increasingly difficult to set accurately as the scale readings become closer together. The present invention obviates that problem by providing a set point resistor that varies linearly (arithmetic progression) as the unknown resistance varies non-linearly (harmonic progression).

As seen in the drawing, the control circuit is energized from a conventional alternating-current (a.c.) source (not shown) connected to input terminals 10, 12. The terminals 10, 12 are connected to opposite ends of a primary winding 14P of a transformer 14. The transformer 14 has three secondary windings 14A, 14B, 14C, whose polarities are conventionally indicated by dots.

The ends of the secondary winding 14A are connected to opposite juncture points 16, 18 of a four-arm resistance bridge, indicated generally by the numeral 20. One arm of the bridge 20 comprises a fixed resistor R1 and a linearly wound potentiometer 22 having a variable contact arm 22A, that provides a variable amount of resistor R2 between the arm 22A and the resistor R1. One end of the resistor R1 is connected to the input juncture point 16; the potentiometer arm 22A is connected to one end of a fixed resistor R3, whose other end is connected to the input juncture point 18. The other two arms of the bridge connected in series between the input points 16, 18 respectively consist of a fixed resistor R4 and an unknown variable resistor R5. The variable resistor R5 represents diagramatically the resistance of a substance or material whose resistance is to be controlled in a process control operation.

Output points for the bridge 20 are a juncture point 24 between the resistors R4 and R5 and the end of the potentiometer 22 remote from the resistor R1. In the particular case illustrated, the utilization device connected between the output points is a PNP transistor 26, whose base is connected to the potentiometer 22 and whose emitter is connected to the output point 24, and which provides an energizing signal when it conducts. The collector of the transistor 26 is connected into an automatic control circuit to be later described. In a manual control arrangement, the transistor 26 may be replaced by a meter (not shown). In an alternative arrangement, the potentiometer 22 may be replaced by a conventional variable resistor, and the resistor R3 and the base of the transistor 26 both connected to the same end of the variable resistor. However, the illustrated arrangement is preferred.

One of the features of the present invention is that a set point control (the potentiometer 22) in the bridge 20 can be wound linearly and provided with a linear scale 23 graduated in units of "X" even though the unknown resistance R5 varies in a harmonic progression (the reciprocal of resistance). The method of operation of the bridge 20 can be best understood by considering the mathematics involved.

First, $$R5 = k/x, \quad (1)$$

where $x$ varies in an arithmetic progression, i.e., 1, 2, 3, 4, $t$ and so on, so that R5 varies in a harmonic progression.

In order for the bridge to be in balance, $$R5/R4 = R3/(R1+R2) \quad (2)$$

Substituting equation (1) into equation (2), $$(k/x)/R4 = R3/(R1+R2) \quad (3)$$

Solving for R2, $$R2 = [(R3 \cdot R4 \cdot x)/k] - R1 \quad (4)$$

Since R3, R4, R1 and $k$ are constants, equation (4) may be written as $$R2 = mx - R1, \quad (5)$$

where $m$ equals $R3 \cdot R4/k$. Equation (5) defines a straight line of the "slope-intercept" form. Thus, even though R5 varies as a harmonic progression, R2 is varied linearly (arithmetic progression) to balance the bridge.

In the control circuit illustrated, the collector of the transistor 26 is connected in series with a resistor 28 and a diode 30 to one end of the transformer secondary winding 14B. A capacitor 32 is paralleled with the resistor 28. The other end of the winding 14B is connected through a primary winding 34P of a transformer 34 to the output juncture point 24. The primary purpose of the diode 30 is to prevent damage to the transistor 26 when its collector tends to become more positive than its emitter.

With polarities of the secondary windings being as shown, when the bridge 20 is balanced so that $R5/R4 = R3/(RA1+R2)$, the transistor 26 will be conductive because its emitter is positive when its base is negative. When $R5/R4$ becomes less than $R3/(R1+R2)$, the transistor 26 will be non-conductive; when $R5/R4$ is equal to or greater than $R3/(R1+R2)$, the transistor 26 is conductive.

It is particularly pointed out that, by connecting an increasing portion of the resistance winding of the potentiometer 22 in series with the base of the transistor 26, as the arm 24A approaches R1, the transistor 26 becomes less sensitive to changes in R5. This is advantageous in certain process control arrangements. It is also pointed out that if the polarity of either one of the transformer windings 14A or 14B is reversed, so that the potentials on the emitter and collector of the transistor 26 are in phase, the transistor will be non-conductive when $R5/R4$ is equal to or greater than $R3/(R1+R2)$. Of course, it will be conductive when $R5/R4$ is less than $R3/(R1+R2)$.

When the bridge 20 is balanced so that the transistor 26 conducts, half-wave rectified current flows through the primary winding 34P of the transformer 34 to energize an activating circuit. A secondary winding 34S of that transformer is connected to trigger a conventional Schmitt trigger circuit indicated generally by the numeral 36. The windings 34P, 34S have polarities as conventionally indicated by dots. The pulsating or half-wave rectified current output from the secondary winding 34S passes through a diode 35 and is smoothed by by a resistor 38 and a capacitor 40 connected in parallel across the winding 34S. Power is provided for the Schmitt trigger circuit from the transformer secondary winding 14C, which has a diode 42 connected in one lead 44 and a smoothing capacitor 46 connected between the diode cathode and the other transformer secondary lead 48.

The conventional Schmitt trigger circuit 36 comprises a pair of PNP transistors 50, 52 having their emitters connected together and thence through a resistor 54 to a lead 56. The collector of the transistor 50 is connected through a fixed resistor 58 and a series-connected variable resistor 60 to the transformer lead 48, and through a resistor 62 to the base of the transistor 52. A capacitor 64 is connected across the resistor 62. The base of the transistor 52 is also connected through a resistor 66 to the lead 56. The lead 56 is connected between one end of the transformer secondary 34S and the cathode of the diode 42.

Signal input to the trigger circuit 36 is to the transistor 50. The base of that transistor is connected through a resistor 68 to one end of the transformer secondary 34S. The other end of the secondary winding 34S is connected to the lead 56. Signal output from the trigger circuit 36 is taken from the collector of the transistor 52, which is connected through a resistor 70 to the control electrode of a full-wave or of a bidirectional rectifying device 72.

The Schmitt trigger circuit 36 is conventional in construction and operation. Therefore, its operation will not be described in detail. Suffice it to say that when a signal of sufficient amplitude appears across the resistor 38, the normally non-conducting trigger circuit 36 is turned off. In other words, the transistor 50 is normally non-conducting and the transistor 52 is conducting. The appearance of a negative signal across the resistor 38 reverses this condition; the transistor 50 conducts and the transistor 52 is non-conductive. The setting of the variable resistor 60 determines the input signal level at which the circuit triggers.

The device 72 may be described as a bi-directional triode arrangement or as two silicon-controlled rectifiers connected in parallel with opposite polarities and their control electrodes connected together. It is shown in the drawing as a "Triac," which is manufactured and sold by General Electric Company, Syracuse N.Y. Of course, other similar arrangements may be employed.

The device 72 has two input electrodes that are connected together and through a lead 74 to one side of the a.c. source at the input terminal 10. The input electrodes of the device 72 are also connected directly to the negative lead 48. The device 72 also has an output electrode that is connected by way of a lead 76 to a load 77, whose return is to the terminal 12. The load may be a relay or other process control device.

In operation, when the bridge 20 is unbalanced, the transistor 26 is non-conducting, so that no current flows through the primary 34P of the transformer 34. In this condition, the transistor 50 is non-conducting and the transistor 52 is conducting. This causes a voltage to be developed across the resistor 70 that causes the rectifying device 72 to conduct and provide a direct current (d.c.) through the lead 76 to the load. When the bridge 20 becomes balanced in the proper direction and amount, the transistor 26 will conduct on alternate half-cycles of the bridge input voltage. Of course, the bridge may be balanced by a change in the set point control 22A or a change in the resistor R5 representing the process variable. When the transistor 26 conducts to a sufficient extent, the voltage induced in the secondary 34S of the transformer 34 develops sufficient negative voltage across the resistor 38 to turn on the transistor 50 in the trigger circuit 36. This causes the transistor 52 to turn off, and the potential on its collector and hence on the control electrode of the device 72 to go to zero. This turns off conduction through the device 72, and permits a relay or other load device connected to the output lead 76 to drop out.

Although only one embodiment of the invention has been shown, it is understood that various equivalents may be substituted for certain of the components of the circuitry without departing from the spirit and scope of the invention.

I claim:

1. In a process control circuit,
   a. an electrical bridge for connection to a voltage source and having four arms, a first arm for containing an unknown resistance that varies in a harmonic progression relative to an arithmetical progression of a parameter of a substance being monitored, a second arm of which opposite said first arm contains a set point resistor that is variable in an arithmetic progression, third and fourth arms of which contain first and second fixed resistors;
   b. utilization means connected across said bridge and responsive to unbalance of said bridge for providing an energizing signal; and,
   c. an activating circuit responsive to said energizing signal for providing an output signal to tend to cause rebalance of said bridge.

2. In a process control circuit,
   a. an electrical bridge for connection to a voltage source and having four arms, a first arm for containing an unknown resistance that varies in a harmonic progression, a second arm of which opposite said first arm contains a set point resistor that is variable in an arithmetic progression, third and fourth arms of which contain first and second fixed resistors;

b. utilization means connected across said bridge and responsive to unbalance of said bridge for providing an energizing signal said utilization means comprises a transistor having its base electrode connected to a juncture of said second and third arms of said bridge and another electrode connected to a juncture of said first and fourth arms of said bridge; and, c. an activating circuit responsive to said energizing signal for providing an output signal to tend to cause rebalance of said bridge.

3. The circuit of claim 2, wherein said second arm comprises a third fixed resistor and a potentiometer having a movable arm, serving as a set point control, and having said movable arm electrically connected to said third arm of said bridge.

4. The circuit of claim 3, wherein one end of said potentiometer is connected to said fixed resistor and another end of said potentiometer is connected to said utilization means.

5. The circuit of claim 2, wherein said activating circuit comprises a Schmitt trigger and gate-controlled bi-directional conductive means controlled by said Schmitt trigger.

6. The circuit of claim 3, wherein said activating circuit comprises a Schmitt trigger and gate-controlled bi-directional conductive means controlled by said Schmitt trigger.

7. The circuit of claim 4, wherein said activating circuit comprises a Schmitt trigger and gate-controlled bi-directional conductive means controlled by said Schmitt trigger.

8. In a process control circuit, a. an electrical bridge for connection to a voltage source and having four arms, a first arm for containing an unknown resistance that varies in a harmonic progression, a second arm of which opposite said first arm contains a set point resistor that is variable in an arithmetic progression, third and fourth arms of which contain first and second fixed resistors, said second arm comprises a third fixed resistor and a potentiometer having a movable arm, serving as a set point control, and having said movable arm electrically connected to said third arm of said bridge;

b. utilization means connected across said bridge and responsive to unbalance of said bridge for providing an energizing signal; and, c. an actiavting circuit responsive to said energizing signal for providing an output signal to tend to cause rebalance of said bridge.

9. The circuit of claim 8, wherein one end of said potentiometer is connected to said fixed resistor and another end of said potentiometer is connected to said utilization means.

10. The circuit of claim 8, wherein said activating circuit comprises a Schmitt trigger and gate-controlled bi-directional conductive means controlled by said Schmitt trigger.

11. The circuit of claim 9, wherein said activating circuit comprises a Schmitt trigger and gate-controlled bi-directional conductive means controlled by said Schmitt trigger.

12. In a process control circuit, a. an electrical bridge for connection to a voltage source and having four arms, a first arm for containing an unknown resistance that varies in a harmonic progression, a second arm of which opposite said first arm contains a set point resistor that is variable in an arithmetic progression, third and fourth arms of which contain first and second fixed resistors;

b. utilization means connected across said bridge and responsive to unbalance of said bridge for providing an energizing signal; and c. an activating circuit comprising a Schmitt trigger and gate-controlled bi-directional conductive means controlled by said Schmitt trigger and responsive to said energizing signal for providing an output signal to tend to cause rebalance of said bridge.

13. An electrical bridge arrangement of four arms comprising:

a. a first arm for containing an unknown resistance that varies in a harmonic progression relative to an arithmetic progression of a parameter of a substance being monitored;

b. a second arm opposite said first arm containing a resistor that is variable in an arithmetic progression;

c. third and fourth arms containing first and second fixed resistors; and, d. utilization means connected with one end between said first and third arms and another end connected between said second and fourth arms.

14. The bridge arrangement of claim 13, wherein said utilization means comprises a transistor having its base electrode connected to a juncture of said second and fourth arms of said bridge and another electrode connected to a juncture of said first and third arms of said bridge.

15. The bridge arrangement of claim 13, wherein said second arm comprises a third fixed resistor and a potentiometer having a movable arm, serving as a set point control, and having said movable arm electrically connected to said fourth arm of said bridge.

16. The bridge arrangement of claim 14, wherein said second arm comprises a third fixed resistor and a potentiometer having a movable arm, serving as a set point control, and having said movable arm electrically connected to said fourth arm of said bridge.

17. The bridge arrangement of claim 15, wherein one end of said potentiometer is connected to said fixed resistor and another end of said potentiometer is connected to said utilization means.

18. The bridge arrangement of claim 16, wherein one end of said potentiometer is connected to said fixed resistor and another end of said potentiometer is connected to said utilization means.

19. An apparatus for monitoring a parameter of a substance which varies as an arithmetic progression and comprising:

a. an electrical bridge for connection to a voltage source and having four arms; said first arm including a variable resistor whose value varies as a harmonic progression relative to the arithmetic progression of a said substance parameter, said second arm being opposite said first arm and including a set point resistor having a variable contact arm, said set point resistor including a scale calibrated in linear increments and exhibiting the characteristic of presenting a resistance which varies linearly with linear movement of said contact arm; and said third and fourth arms including first and second resistors;

b. actuator means connected across said bridge for providing an energizing signal in response to an unbalanced condition of said bridge; and, c. control circuit means connected to said actuator means for, upon receipt of an energizing signal, rebalancing said bridge.

20. The circuit of claim 19, wherein said control apparatus comprises a Schmitt trigger and gate-controlled bidirectional conductive means controlled by said Schmitt trigger.

21. An apparatus for monitoring a parameter of a substance which varies as a function of resistivity and comprising:

a. an electrical bridge for connection to a voltage source and having four arms; said first arm including a variable resistor whose value varies in accordance with a nonlinear function; said second arm being opposite said first arm and including a set point resistor having a variable contact arm, said set point resistor including a scale calibrated in linear increments and exhibiting the characteristic of presenting a resistance which varies linearly with linear movement of said contact arm; and said third and fourth arms including first and second resistors;

b. actuator means connected across said bridge for providing an energizing signal in response to an unbalanced condition of said bridge; and, c. control circuit means comprising a Schmitt trigger and gate-controlled bi-directional conductive means controlled by said Schmitt trigger connected to said actuator means for, upon receipt of an energizing signal, providing a signal for rebalancing said bridge.

* * * * *